April 22, 1958 S. LUBKIN 2,832,064
CYCLIC MEMORY SYSTEM
Filed Sept. 6, 1955
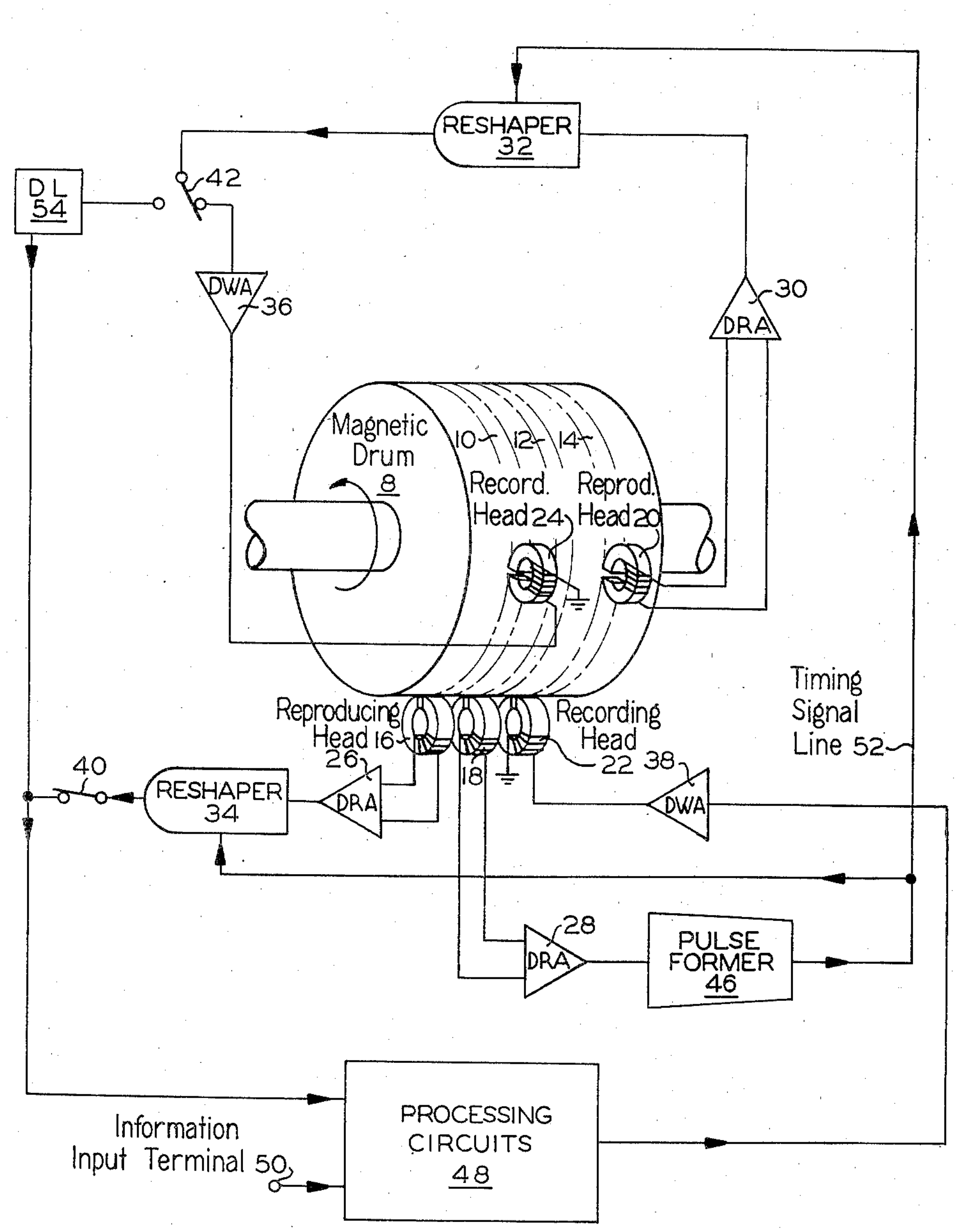
DATA PROCESSOR 6
INVENTOR.
SAMUEL LUBKIN
BY S.C. Yuter
ATTORNEY.

United States Patent Office 2,832,064

Patented Apr. 22, 1958

2,832,064

CYCLIC MEMORY SYSTEM

Samuel Lubkin, Bayside, N. Y., assignor to Underwood Corporation, New York, N. Y., a corporation of Delaware Application September 6, 1955, Serial No. 532,666

15 Claims. (Cl. 340—174)

This invention relates to data processors and more particularly to data processors having cyclic type memories such as magnetic drums, delay line registers and shift registers.

Any data processing problem can be broken down into a sequence of simple arithmetic and logical operations. Electronic data processors are capable of carrying out these arithmetic and logical operations at extremely high speeds. A data processor can therefore be used to process large quantities of data in a small fraction of the time required by a human being.

The data processing problem to be solved is broken down into a sequence of simple steps. Each of these steps is specified by an instruction, and a sequence of instructions is called a program. This program and all other necessary information is entered into the data processor's memory. The data processor thereafter carries out the instructions automatically and at high speed.

In most of the basic operations carried out by the data processor a transfer of information or data between the memory and the processing units occurs. New data is drawn from the memory, processed and returned to the memory. In order to shorten the overall processing time, it is desirable to minimize the time required for the data to be in the processing units and also to minimize the time for transferring the data to and from the memory.

In present day data processors the time required for the data to be processed by the processing units is extremely short, while the time required to locate and transfer information between the memory and the processing units may be time consuming particularly when cyclic memories are employed for storing data.

A cyclic memory is a memory having a number of data positions for storing the data. The data positions sequentially pass a transfer station. A specific information position just passing a transfer station is not again available to participate in a transfer operation until all the remaining information positions have passed the transfer station.

A typical cyclic memory is a rotating magnetic drum having a transfer station which is a transducing head. The transducing head is placed opposite a track of the magnetic drum and the areas of magnetic material move past the transducing head. Any specific point on the track is opposite the head only once a drum revolution. Thus the data stored at this point can only enter into a transfer operation once a drum revolution.

During a step of a program the data is transferred from a position on the magnetic drum, operated upon and usually returned to the same position on the magnetic drum. The time for processing of the data is usually in the order of microseconds. Upon completion of the processing operation the desired position is no longer opposite the transducing head so the processed data must be temporarily stored awaiting the next arrival of the data position at the transducing head. Since the time required for the magnetic drum to make a revolution is in the order of milliseconds, a relatively long time interval occurs before the processed data is transferred back to the magnetic drum. It should be noted that the ratio of actual processing time to transfer time is usually in the order of about one to one hundred.

Some data processors have reduced this ratio by programming the processing problem differently. The data that is to be operated upon is drawn from one information position and returned to a second information position. The optimum choice of the second information position is the one just opposite the transducing head when the processing circuits complete processing the data.

Unfortunately, this type of programming requires additional information in the program and therefore requires more positions for storage in the memory. Secondly, more time is required to prepare the program for the data processor since greater thought and ingenuity are required in having the program utilize memory positions and time most efficiently. Further, in applications where it is necessary to store particular items in the same position in the memory, this type of programming cannot be used.

It is therefore an object of the invention to provide improved apparatus for processing data rapidly and more efficiently.

It is another object of the invention to provide apparatus for minimizing processing time in a data processor having a cyclic memory.

It is a further object of the invention to provide apparatus for decreasing the transfer time between the processing circuits and a cyclic memory such as a rotating magnetic drum.

In accordance with the invention appartus is provided for processing data stored as signals in a cyclic memory. The units of data are stored in sequential positions of the cyclic memory such that each unit of data is available for transfer once each cycle of the memory. A first transfer station receives the units of data from the positions of the cyclic memory and transfers the units of data to a processing circuit. The data is processed and fed to a second transfer station. The second transfer station returns the processed data to the same position from which the originally unprocessed data was drawn. Interposed between the first and second transfer station is a delay means. The time of delay introduced by the delay means is adjusted so that the time required for data signals to pass from the first to the second transfer station via the processing circuit and the delay means is the same as the time required for the data signals to pass from the first to the second transfer station via the cyclic memory.

An advantage of the invention is that the delay means may readily be employed to store other data.

A feature of the invention when a rotating drum is employed as a cyclic memory is the use of a separate channel on the drum as the delay means. An advantage of employing a separate channel as a delay means is that the delay is obtained in a relatively inexpensive manner.

Other objects, features and advantages will appear in the subsequent detailed description which is accompanied by drawings wherein the sole figure is a schematic block diagram, partially in perspective, of a data processor employing a rotating magnetic drum type of cyclic memory in accordance with the preferred embodiment of the invention.

Referring to the sole figure, the data processor 6 is shown comprising: the magnetic drum 8 having the tracks 10, 12 and 14; the reproducing heads 16, 18 and 20; the recording heads 22 and 24; the drum-reading amplifiers 26, 28 and 30; the reshapers 32 and 34; the drum-writing amplifiers 36 and 38; the switches 40 and 42; the pulse former 46; the processing circuits 48; and the delay line 54.

The reproducing head 16 is positioned opposite the track 10. The reproducing head 16 is coupled to the drum-reading amplifier 26. The drum-reading amplifier 26 is linked to an input terminal of the reshaper 34. The reshaper 34 is connected via the switch 40 to the processing circuits 48. The processing circuits 48 are linked via the drum-writing amplifier 38 to the recording head 22 which is positioned opposite the track 14.

The reproducing head 20 is also positioned opposite the track 14 but peripherally spaced along the track 14 from the recording head 22. The drum-reading amplifier 30 and the reproducing head 20 are connected. The drum-reading amplifier 30 is coupled to the reshaper 32. The output terminal of the reshaper 32 is linked via the single-pole double throw switch 42 to either the drum-writing amplifier 36 which feeds the recording head 24, or via the delay line 54 and the processing circuits 48 to the drum-writing amplifier 38 which feeds the recording head 22. The recording head 24 is positioned opposite the track 10.

The reproducing head 18 is positioned opposite the timing track 12 in which a sine wave is recorded. The reproducing head 18 is connected to the drum-reading amplifier 28. The drum-reading amplifier 28 is coupled to the pulse former 46. The pulse former 46 is connected to the timing signal terminals of the reshapers 32 and 34 via the timing signal line 52.

The magnetic drum 8 is a cylinder having a peripheral surface coated with a magnetizable material such as one of the oxides of iron. The coating has the property of retaining a magnetization pattern until the pattern is changed by an external magnetic field. The tracks 10, 12 and 14 are peripheral and parallel bands on the surface of the cylinder.

While the reproducing head 16 and the recording head 24 are shown as spaced about seventy-five degrees apart, it should be noted that any spacing may be appropriate. The same is true for the spacing of the reproducing head 20 and the recording head 22.

The reproducing heads 16, 18 and 20 and the recording heads 20 and 22 are magnetic transducing elements each comprising a pair of pole pieces having a gap between the pole pieces and a coil of wire wrapped around the pole pieces. The gaps are positioned opposite the respective tracks. When a current flows through the coil of a recording head a magnetic flux is created at the associated gap. The lines of magnetic flux entering the magnetic coating opposite the gap produce a magnetization pattern on the portion of the track opposite the gap. When the magnetization pattern of the track moves past the gap of a reproducing head, a voltage is induced in the coil of the reproducing head. The induced voltage is a function of the time rate of change of the magnetization pattern.

The drum-reading amplifiers 26, 28 and 30 are suitable high-gain voltage amplifiers for amplifying the voltage signals induced in the reproducing heads. The drum-writing amplifiers 36 and 38 are current amplifiers for supplying current to create sufficient magnetic flux in the gaps of the recording heads to change the magnetization on the portion of the track opposite the gap.

The reshapers 32 and 34 are electronic circuits for reshaping and retiming poorly formed pulse signals into precisely-timed and well-shaped pulse signals.

A suitable reshaper can be of the type used in the S. E. A. C. Computer of the National Bureau of Standards. The circuit for such a reshaper is shown in Fig. 1.13 on page 20 of the National Bureau of Standards Circular 551 entitled "Computer Development (SEAC and DYSEAC) at the National Bureau of Standards, Washington, D. C.," issued January 25, 1955.

The pulse former 46 can be a voltage amplifier and clipper. When a sine-wave signal is fed to the input of the pulse former 46, the signal is greatly amplified and the positive and negative peaks of the sine-wave signal are clipped so that a relatively square-wave signal is obtained.

The processing circuits 48 can be any circuits for performing a desired operation. For example, the processing circuits may be an arithmetic unit for performing an addition. A suitable arithmetic unit can be the binary adder shown as item 14 of Fig. 4.2 on page 77 of the above-cited publication. The signal fed to the information input terminal 50 can be from a signal source generating the pulse representation of a number to be added to the pulse representation of data stored on the magnetic drum 8.

The operation of the data processor 6 will be first described.

With switch 40 closed and switch 42 connected to the drum-writing amplifier 36, the data to be processed is read from the track 10 by the reproducing head 16 and after amplification by the drum-reading amplifier 26 is fed to the processing circuits 48 via the reshaper 34. The processing circuits 48 modify the data, for example by adding a number, and the modified data is transferred to the drum-writing amplifier 38. The drum-writing amplifier 38 generates current pulses which cause a magnetization pattern to be recorded on the track 14 of the rotating magnetic drum 8. After a period of time the recorded magnetization pattern passes under the reproducing head 20 inducing voltage pulses that are amplified by the drum-reading amplifier 30. The amplified pulses are reshaped by the reshaper 32 and fed to the drum-writing amplifier 36. The amplified current pulses from the drum-writing amplifier 36 are fed to the recording head 24 and a corresponding magnetization pattern is recorded on the track 10.

Thus data is read from the track 10, processed and recorded again in the correct position on the track 10 in less than one drum revolution.

For example, in a working embodiment of the invention, track 10 is fifty number-lengths long so that fifty numbers (each being ten decimal digits plus a sign) may be stored. The reproducing head 16 and the recording head 24 are spaced one number-length apart along the track 10. The recording head 20 and the reproducing head 22 are spaced slightly less than one number-length apart, the difference in delay being made up in the circuitry.

When a number is to be added to some or all of the numbers stored in track 10, the number is fed at the appropriate times to the information input terminal 50 (assuming that the processing circuit 48 is operating as an adder). Each number which is processed is then fed via the track 14 to be recorded in track 10 one number-length later in the same position which contained the original number. Thus, in one revolution of the magnetic drum 8, any or all of the stored numbers can be processed. It is necessary to position the heads 16 and 24 and the heads 20 and 22 so that a unit of data is read from a position in track 10, processed, recorded in track 14 and then transferred to the original position in track 10. Therefore, the time required to transfer the unit of data from the reading head 16 to the recording head 24 is chosen to be the time consumed while the position passes from under the reading head 16 to under the recording head 24.

To further insure that the data is stored in the proper positions, the signals representing the data are synchronized to the drum rotation by means of the reshapers 32 and 34. The reshapers 32 and 34 also serve to restore the shape of the pulse signals.

The sine-wave magnetization pattern is read from the timing channel 12 by the reproducing head 18, amplified by the drum-reading amplifier 28 and fed to the pulse former 46. The output of the pulse former 46 is a nearly square-wave signal which is fed to the timing terminals of the reshapers 32 and 34. The signals fed from the output terminals of the reshapers 32 and 34 are equivalent timewise to signals present at the timing terminals. Thus the signals representing the data are synchronized with the drum rotation.

It should be noted that during the transfer of data to and from the track 10, the data is also transferred from the track 10 to the track 14.

Whenever it is desired to store data in track 14 separate from the data recorded in track 10, i. e., using track 14 together with processor 48 as an independent one-word register, it is only necessary to open the switch 40 and switch the reshaper 32 from the drum-writing amplifier 36 to the delay line 54 by the switch 42. The purpose of the delay line 54 (which may be of the lumped parameter type) is to compensate for other delays in the circuitry in order to maintain the timing of the system. Thus, both the tracks 10 and 14 can be used as cyclic memories for storing data.

Switches 40 and 42 may be controlled by the same relay or electronic switching circuits may readily be employed.

Thus, in accordance with the invention, a data processor has been provided employing a cyclic member which permits the rapid, efficient and relatively inexpensive processing of data. In addition, the data processor permits data to be either continuously processed or stored for long periods of time. Further, the delay means may also be used as a cyclic memory to store other data.

Although only one embodiment of the invention has been shown, there will now be obvious to those skilled in the art many modifications and variations utilizing the principles set forth and realizing many or all of the objects and advantages but which do not depart essentially from the spirit of the invention.

What is claimed is:

1. In a data processor having processing means for processing data represented by signals, apparatus comprising a cyclic memory having a plurality of positions for storing data, a reader to render the data in each of said positions sequentially available for transfer once every cycle, storage means having a plurality of positions for storing data, the number of positions of said storage means being less than the number of positions of said cyclic memory, means including said storage means for transferring data between the processing means and said cyclic memory, data being transferred from a position in said cyclic memory, being processed by the processing means and the processed data being temporarily retained in said storage means, and a recorder connected to said storage means to record the processed data in the same position of said cyclic memory from which data was read and in less than one cycle of said cyclic memory.

2. In a data processor having processing means for processing data represented by signals, apparatus comprising a cyclic memory having a reading and a recording unit, said cyclic memory having a plurality of positions for storing data, the data in each of said positions being made sequentially available by said reading unit for transfer once every cycle, delay means having a plurality of positions for storing data, the number of positions of said delay means being less than the number of positions of said cyclic memory, and means for transferring data between said cyclic memory and the processing means via said delay means, the data being read from a position in said cyclic memory, processed by the processing means and temporarily retained in said delay means, and means connecting said delay means to said recording unit whereby data is returned to the same position in said cyclic memory in less than one cycle of said cyclic memory.

3. In a data processor having processing means for processing data represented by signals, apparatus comprising a rotatable magnetic drum, a reading head, and a recording head, said rotatable magnetic drum having a plurality of positions for storing data, the data in each of said positions being sequentially available for transfer from said reading head once every cycle, storage means having a plurality of positions for storing data, the number of data storage positions of said storage means being less than the number of positions of said rotatable magnetic drum, and means for transferring data from said reading head of said rotatable magnetic drum to said processing means and via said storage means to said recording head, the data being transferable from a position on said rotatable magnetic drum for processing by the processing means and the processed data being recorded by said recording head in the same position on said rotatable magnetic drum in less than one cycle of said cyclic memory.

4. In a data processor having processing means for processing data represented by signals, apparatus comprising a cyclic memory, said cyclic memory being a first track of a magnetic drum a first reading head and a first recording head, said cyclic memory having a plurality of positions for storing data, the data in each of said positions being sequentially available for transfer by said reading head once every cycle, delay means having a plurality of positions for storing data, said delay means being a portion of a second track of a magnetic drum a second reading head and a second recording head, the number of data storage positions of said delay means being less than the number of positions of said cyclic memory, and means for transferring data from said first reading head of said cyclic memory via said processing means to said second recording head of said delay means and thereafter from said second reading head to said first recording means, the data being extracted from a position in said cyclic memory then processed by the processing means and returned to the same position in said cyclic memory in less than one cycle of said cyclic memory.

5. Apparatus for processing data represented by signals comprising a cyclic memory for storing the data as signals, said cyclic memory having a plurality of positions for storing the data, said cyclic memory having an input and an output, a storage means having a plurality of positions for storing data as signals and having an input and an output, said storing means having fewer positions than said cyclic memory, means for synchronizing signals stored in said cyclic memory with signals stored in said storage means, a data processing unit having an input and an output, means for coupling the output of said cyclic memory to the input of said data processing unit, means for coupling the output of said data processing unit to the input of said storage means, and means for coupling the output of said storage means to the input of said cyclic memory such that the data as signals transferred from positions in said cyclic memory to said processing unit is returned to the same positions in less than one cycle of said cyclic memory.

6. Apparatus for continuously processing data represented by signals comprising a first cyclic memory having a plurality of positions for storing the data as signals, said first cyclic memory having an input and an output, a delay means including a portion of a second cyclic memory for storing data as signals, said delay means having an input and an output, means for synchronizing signals stored in said first cyclic memory with signals stored in said second cyclic memory, a data processing unit having an input and an output, means for coupling the output of said first cyclic memory to the input of said data processing unit, means for coupling the output of said data processing unit to the input of said delay means, and means for coupling the output of said delay means to the input of said first cyclic memory such that the data as signals transferred from positions in said first cyclic memory to said processing unit is returned to the same information positions in less than one cycle of said first cyclic memory.

7. Apparatus for processing data represented by signals comprising a first cyclic memory having a plurality of positions for storing data, said first cyclic memory having an input and an output, a second cyclic memory for storing data having an input and an output, there being more positions between the input and the output of said first cyclic memory than between the input and the output of said second cyclic memory, means for synchronizing signals stored in said first cyclic memory with signals stored in said second cyclic memory, a processing unit having an input and an output, means for coupling the output of said first cyclic memory to the input of said second cyclic memory, means for coupling the output of said second cyclic memory to the input of said processing unit, and means for coupling the output of said processing unit to the input of said first cyclic memory such that the data as signals transferred from positions in said first cyclic memory to said processing unit via said second cyclic memory is returned to the same information positions in less than one cycle of said first cyclic memory.

8. Apparatus for processing data represented by signals comprising a processing circuit having an input and an output, a rotatable magnetic drum having first and second tracks for storing data as magnetization patterns at predetermined positions, a recording head and a reproducing head associated with each of said tracks, each of said recording heads being positioned a peripheral distance along the associated track from the associated reproducing head, the reproducing head of said first track being coupled to the input of said processing circuit, the output of said processing circuit being coupled to the recording head of said second track, the reproducing head of said second track being coupled to the recording head of said first track, the peripheral spacing between the reproducing head and recording head associated with said second track being less than the peripheral spacing between the recording head and reproducing head associated with said first track such that the time required for signals to be reproduced from said first track, operated upon by said processing circuit and transferred via said second track to the recording head of said first track is the same as the time required for a position in said first track to rotate from the reproducing head of said first track to the recording head of said first track.

9. Apparatus for processing data represented by signals comprising a processing circuit having an input and an output, a rotatable magnetic drum having first and second tracks for storing data as magnetization patterns at predetermined positions, a recording head and a reproducing head associated with each of said tracks, each of said recording heads being positioned a peripheral distance along the associated track from the associated reproducing head, the reproducing head of said first track being coupled to the input of said processing circuit, the output of said processing circuit being coupled to the recording head of said second track, the reproducing head of said second track being coupled to the recording head of said first track, the peripheral spacing between the reproducing head and recording head associated with said second track being less than the peripheral spacing between the recording head and reproducing head associated with said first track such that the time required for signals to be reproduced from said first track, operated upon by said processing circuit and transferred via said second track to the recording head of said first track is the same as the time required for a position in said first track to rotate from the reproducing head of said first track to the recording head of said first track and a switching means for disconnecting said reproducing head of said first track from said input of said processing circuit and for transferring the output of said reproducing head of said second track to said input to retain unchanged the data on said first track and to enable use of said second track as a register.

10. Apparatus for processing data represented by signals comprising processing circuit having an input and an output, a rotatable magnetic drum having first and second tracks for storing data as magnetization patterns at predetermined positions, a recording head and reproducing head associated with each of said tracks, each of said recording heads being positioned a peripheral distance along the associated track from the associated reproducing head, the reproducing head of said first track being coupled to the input of said processing circuit, the output of said processing circuit being coupled to the recording head of said second track, the reproducing head of said second track being coupled to the recording head of said first track, the peripheral spacing between the reproducing head and recording head associated with said second track being less than the peripheral spacing between the recording head and reproducing head associated with said first track such that the time required for signals to be read from said first track, operated upon by said processing circuit and transferred via said second track to the recording head of said first track is the same as the time required for a position in said first track to rotate from the reproducing head of said first track to the recording head of said first track and means for synchronizing the transferred signals with said rotatable magnetic drum.

11. Apparatus for processing data represented by signals comprising processing circuit having an input and an output, a rotatable magnetic drum having first and second tracks for storing data as magnetization patterns at predetermined positions, a recording head and reproducing head associated with each of said tracks, each of said recording heads being positioned a peripheral distance along the associated track from the associated reproducing head, the reproducing head of said first track being coupled to the input of said processing circuit, the output of said processing circuit being coupled to the recording head of said second track, the reproducing head of said second track being coupled to the recording head of said first track, the peripheral spacing between the reproducing head and recording head associated with said second track being less than the peripheral spacing between the recording head and reproducing head associated with said first track such that the time required for signals to be read from said first track, operated upon by said processing circuit and transferred via said second track to the recording head of said first track is the same as the time required for a position in said first track to rotate from the reproducing head of said first track to the recording head of said first track, means for synchronizing the transferred signals with said rotatable magnetic drum and switching means for disconnecting said reproducing head of said first track from said input of said processing circuit and for transferring the output of said reproducing head of said second track to said input to retain unchanged the data on said first track and to enable use of said second track as a register.

12. Apparatus for processing data represented by signals comprising a processing circuit having an input and an output, a rotatable magnetic drum having first and second tracks for storing data as magnetization patterns at predetermined positions, a recording head and a reproducing head associated with each of said tracks, each recording head being displaced a peripheral distance along the associated track from the associated reproducing head, the reproducing head of said second track being coupled to the recording head of said first track, the reproducing head of said first track being coupled to the input of said processing circuit, the output of said processing circuit being coupled to the recording head of said second track, the peripheral spacing between the reproducing head and the recording head associated with said second track being less than the peripheral spacing between the recording head and the reproducing head associated with said first track such that the time required for signals to be read from said first track, be transferred to said processing circuits for processing and returned via said second track to the recording head of said first track is the same as the time required for a location on said first track to rotate from the reproducing head of said first track to the recording head of said first track, and switching means for disconnecting said reproducing head for preventing alteration of data recorded on said tracks.

13. Apparatus for processing data represented by signals comprising a processing circuit having an input and an output, a rotatable magnetic drum having first and second tracks for storing data as magnetization patterns at predetermined positions, a recording head and a reproducing head associated with each of said tracks, each recording head being displaced a peripheral distance along the associated track from the associated reproducing head, the reproducing head of said second track being coupled to the recording head of said first track, the reproducing head of said first track being coupled to the input of said processing circuit, the output of said processing circuit being coupled to the recording head of said second track, the peripheral spacing between the reproducing head and the recording head associated with said second track being less than the peripheral spacing between the recording head and the reproducing head associated with said first track such that the time required for signals to be read from said first track, be transferred to said processing circuits for processing and returned via said second track to the recording head of said first track is the same as the time required for a location on said first track to rotate from the reproducing head of said first track to the recording head of said first track, reshaping means in the transfer path to reshape and retime the signals and switching means for disconnecting said reproducing heads for preventing alteration of data recorded on said tracks.

14. Apparatus for processing data represented by signals, said apparatus comprising a cyclical storage device having a plurality of sequential data storage positions, sensing means for sensing seriatim the data stored in said data storage positions, data processing means for processing data sensed by said sensing means, recording means displaced from said sensing means a predetermined number of data storage positions in the direction of progression of said data storage positions in said storage device, said predetermined number being substantially less than said plurality, and means connecting said recording means and said data processing means, said connecting means and said data processing means having a combined transitory data storage capacity equal to said predetermined number of data storage positions whereby data sensed from any data storage position may be processed and the processed data recorded into the same data storage position and recorded in less than a cycle of said cyclical storage device.

15. A data processor having processing means for processing data represented by signals, apparatus comprising a cyclic memory having a plurality of positions for storing data, a readout device for detecting the data in each of said positions, said data being sequentially available for transfer once every cycle, a recording device to insert data into said data storing positions, storage means having a plurality of positions for storing data, the number of positions of said storage means being less than the number of positions of said cyclic memory, and means including said readout device, said processing means, said storage means and said recording device for processing data in said cyclic memory, the data being readout from a position in said cyclic memory, then processed by the processing means and the processed data recorded in the same position in said cyclic memory in less than one cycle of said cyclic memory.

References Cited in the file of this patent

UNITED STATES PATENTS

| | | |
|---|---|---|
| 2,629,827 | Eckert et al. | Feb. 24, 1953 |
| 2,700,148 | McGuigan et al | Jan. 18, 1955 |
| 2,718,356 | Burrell et al. | Sept. 20, 1955 |
| 2,770,797 | Hamilton et al. | Nov. 13, 1956 |

Notice of Adverse Decision in Interference

In Interference No. 91,027 involving Patent No. 2,832,064, S. Lubkin, Cyclic memory system, final judgment adverse to the patentee was rendered May 13, 1964, as to claims 1, 2, 3, 4, 5, 6, 7, 8, 10, 14 and 15.

[*Official Gazette August 25, 1964.*]